US012665869B2

(12) United States Patent
Li et al.

(10) Patent No.: US 12,665,869 B2
(45) Date of Patent: Jun. 23, 2026

(54) DISPLAYING TARGET INFORMATION FROM A SOURCE SESSION IN A TARGET SESSION BASED ON DISPLAY RANGE AND OPERATION PERMISSION

(71) Applicant: Beijing Zitiao Network Technology Co., Ltd., Beijing (CN)

(72) Inventors: Xuehan Li, Beijing (CN); Chen Wang, Beijing (CN); Yizhe Yang, Beijing (CN); Junchen Li, Beijing (CN); Luobin Li, Beijing (CN); Huiming Wang, Beijing (CN); Qiyang Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 129 days.

(21) Appl. No.: 18/571,066

(22) PCT Filed: Aug. 25, 2022

(86) PCT No.: PCT/CN2022/114733
§ 371 (c)(1),
(2) Date: Dec. 15, 2023

(87) PCT Pub. No.: WO2023/025234
PCT Pub. Date: Mar. 2, 2023

(65) Prior Publication Data
US 2024/0291782 A1     Aug. 29, 2024

(30) Foreign Application Priority Data

Aug. 25, 2021    (CN) ......................... 202110981899.X

(51) Int. Cl.
*H04L 51/046*          (2022.01)

(52) U.S. Cl.
CPC .................................. *H04L 51/046* (2013.01)

(58) Field of Classification Search
CPC ..... H04L 51/046; H04L 51/214; H04L 63/10; H04L 67/141; H04L 67/146; H04L 51/216

See application file for complete search history.

(56) References Cited

U.S. PATENT DOCUMENTS

| 7,747,705 | B1 | 6/2010 | Raja |
| 2016/0063276 | A1* | 3/2016 | Pycock ................. H04L 63/102 726/28 |

(Continued)

FOREIGN PATENT DOCUMENTS

| CN | 102137120 A | 7/2011 |
| CN | 102164099 A | 8/2011 |

(Continued)

OTHER PUBLICATIONS

International Search Report in PCT/CN2022/114733, mailed Nov. 23, 2022, 3 pages.

(Continued)

*Primary Examiner* — Johnny B Aguiar
(74) *Attorney, Agent, or Firm* — Astute IP Law Group

(57)          ABSTRACT

Provided are an information processing method and apparatus, a device, and a storage medium. The information processing method includes: receiving target information, a session identifier of a source session group, and indication information that are transmitted by a server, in which the target information is generated based on to-be-forwarded information from the source session group, and the indication information indicates a type of the source session group; determining a display range of the target information and operation permission of the target information based on the indication information and the session identifier of the source session group; and rendering and displaying the (Continued)

target information in a target session based on the display range of the target information and the operation permission of the target information. Therefore, different ranges of the target information and different operation permission of the target information are displayed for different types of source session groups, thereby flexibly displaying information of a forwarded post based on the type of the source session group.

20 Claims, 10 Drawing Sheets

(56)                      References Cited

U.S. PATENT DOCUMENTS

| | | | | |
|---|---|---|---|---|
| 2016/0080304 | A1* | 3/2016 | Hamlin | H04L 51/08 |
| | | | | 709/206 |
| 2018/0181572 | A1 | 6/2018 | Guo et al. | |
| 2020/0167048 | A1* | 5/2020 | Gurtin | H04L 51/046 |
| 2021/0240729 | A1* | 8/2021 | Grant | H04L 67/306 |
| 2022/0294799 | A1* | 9/2022 | Madaan | G06F 16/2379 |
| 2022/0345434 | A1* | 10/2022 | Rhazi | H04L 51/52 |
| 2023/0127356 | A1* | 4/2023 | Monroe | H04L 41/22 |
| | | | | 726/4 |

FOREIGN PATENT DOCUMENTS

| | | | |
|---|---|---|---|
| CN | 107436816 | A | 12/2017 |
| CN | 107733788 | A | 2/2018 |
| CN | 110138645 | A | 8/2019 |
| CN | 111541605 | A | 8/2020 |
| CN | 112187488 | A | 1/2021 |
| CN | 112398727 | A | 2/2021 |
| CN | 112636936 | A | 4/2021 |
| CN | 113300933 | A | 8/2021 |
| CN | 113746722 | A | 12/2021 |
| JP | 2020191090 | A | 11/2020 |
| JP | 2021516835 | A | 7/2021 |
| WO | 2021012952 | A1 | 1/2021 |
| WO | 2021154650 | A1 | 8/2021 |

OTHER PUBLICATIONS

Notification to Grant in CN202110981899.X, mailed Jul. 4, 2022, 4 pages.
Notice of Reasons for Refusal for Japanese Patent Application No. 2023-578057, mailed on Dec. 24, 2024, 15 pages.
"To Share the Message in Slack! Sharing with a message or URL in a private channel", Retrieved from the Internet URL: https://workteria.forward-soft.co.jp/blog/detail/10467, Jul. 15, 2021, 17 pages.

* cited by examiner

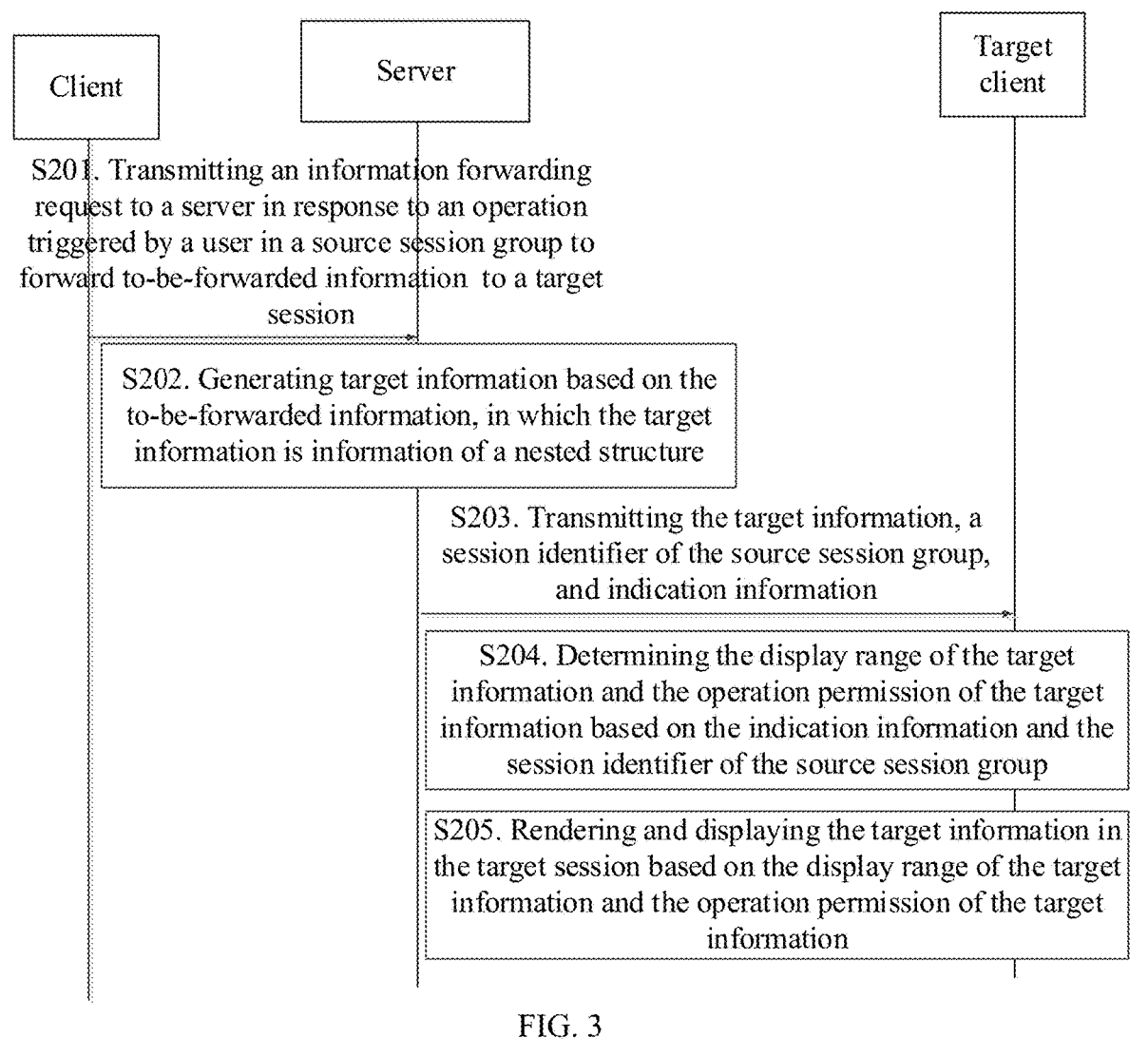

| Client | Server | Target client |
|---|---|---|

S201. Transmitting an information forwarding request to a server in response to an operation triggered by a user in a source session group to forward to-be-forwarded information to a target session S202. Generating target information based on the to-be-forwarded information, in which the target information is information of a nested structure S203. Transmitting the target information, a session identifier of the source session group, and indication information S204. Determining the display range of the target information and the operation permission of the target information based on the indication information and the session identifier of the source session group S205. Rendering and displaying the target information in the target session based on the display range of the target information and the operation permission of the target information

FIG. 3

First view                    Second view

First view                                        Second view

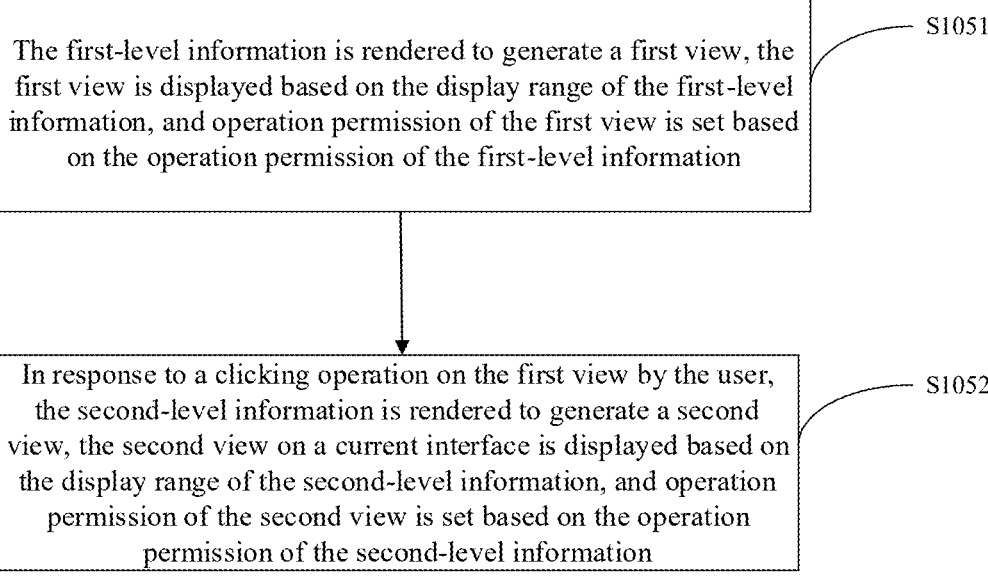

The first-level information is rendered to generate a first view, the first view is displayed based on the display range of the first-level information, and operation permission of the first view is set based on the operation permission of the first-level information    — S1051

In response to a clicking operation on the first view by the user, the second-level information is rendered to generate a second view, the second view on a current interface is displayed based on the display range of the second-level information, and operation permission of the second view is set based on the operation permission of the second-level information    — S1052

FIG. 12

DISPLAYING TARGET INFORMATION FROM A SOURCE SESSION IN A TARGET SESSION BASED ON DISPLAY RANGE AND OPERATION PERMISSION

CROSS REFERENCE TO RELATED APPLICATION

The present application is a national phase of International Application No. PCT/CN2022/114733, filed on Aug. 25, 2022, which claims priority to Chinese Patent Application No. 202110981899.X, titled "INFORMATION PROCESSING METHOD AND APPARATUS, DEVICE, AND STORAGE MEDIUM", and filed on Aug. 25, 2021, the disclosures of which are incorporated herein by reference in their entireties.

FIELD

The present disclosure relates to the field of communication technologies, and more particularly, to an information processing method and apparatus, a device, and a storage medium.

BACKGROUND

Instant messaging (IM) refers to a service that can transmit and receive internet information in real time. With the development of the mobile internet, the IM technology has a characteristic of deep integration with the internet social networking, and therefore various IM clients are widely applied.

Currently, an IM application supports an establishment of a session (i.e., a group chat) of a group including a plurality of users, information published by any user in the group in the group session will be pushed to other users in the group, thereby facilitating discussion of a same topic by the plurality of users. A topic group is a group session mode different from a common group chat, and the difference between the topic group and the common group chat is that each piece of information published by any user in the topic group in a topic group session is a post, and other members in the topic group can perform operations on the post, such as a reply, a comment, forwarding, a subscription. The topic group includes a public topic group and a private topic group. The IM application supports the user to forward a post of the public topic group or the private topic group to other group sessions or single chat sessions. Information of the forwarded post includes information of an original post and operation information on the original post by the user.

However, when the post of the topic group is forwarded to other group sessions or the single chat session for display, how to flexibly display the information of the forwarded post based on a type of the topic group is an urgent problem to be solved.

SUMMARY

The present application provides an information processing method and apparatus, a device, and a storage medium, which can flexibly display information of a forwarded post based on a type of a topic group.

In a first aspect, the present disclosure provides an information processing method. The method is applied to a client. The method includes: receiving target information, a session identifier of a source session group, and indication information that are sent transmitted by a server, in which the target information is generated based on to-be-forwarded information from the source session group, and the indication information indicates a type of the source session group; determining a display range of the target information and operation permission of the target information based on the indication information and the session identifier of the source session group; and rendering and displaying the target information in a target session based on the display range of the target information and the operation permission of the target information.

In a second aspect, the present disclosure provides an information processing method. The method is applied to a server. The method includes: receiving an information forwarding request transmitted by a client, in which the information forwarding request carries to-be-forwarded information from a source session group, an identifier of a target session, and a type of the source session group; generating target information based on the to-be-forwarded information; and transmitting the target information, a session identifier of the source session group, and indication information to a target client corresponding to a user in the target session, in which the indication information indicates the type of the source session group to allow the target client to determine a display range of the target information and operation permission of the target information based on the indication information and the session identifier of the source session group and render and display the target information in the target session based on the display range of the target information and the operation permission of the target information.

In a third aspect, the present disclosure provides an information processing apparatus. The apparatus includes: a receiving module configured to receive target information, a session identifier of a source session group, and indication information that are transmitted by a server, in which the target information is generated based on to-be-forwarded information from the source session group, and the indication information indicates a type of the source session group; a determining module configured to determine a display range of the target information and operation permission of the target information based on the indication information and the session identifier of the source session group; and a display module configured to render and display the target information in a target session based on the display range of the target information and the operation permission of the target information.

In a fourth aspect, the present disclosure provides an information processing apparatus. The apparatus includes: a receiving module configured to receive an information forwarding request transmitted by a client, in which the information forwarding request carries to-be-forwarded information from a source session group, an identifier of a target session, and a type of the source session group; a generating module configured to generate target information based on the to-be-forwarded information; and a transmitting module configured to transmit the target information, a session identifier of the source session group, and indication information to a target client corresponding to a user in the target session, in which the indication information indicates the type of the source session group to allow the target client to determine a display range of the target information and operation permission of the target information based on the indication information and the session identifier of the source session group and render and display the target information in the target session based on the display range of the target information and the operation permission of the target information.

In a fifth aspect, the present disclosure provides a terminal device. The device includes: a processor; and a memory having executable instructions of the processor stored thereon. The processor is configured to perform, when executing the executable instructions, the information processing method according to the first aspect or each possible embodiment of the first aspect.

In a sixth aspect, the present disclosure provides a server. The server includes: a processor; and a memory having executable instructions of the processor stored thereon. The processor is configured to perform, when executing the executable instructions, the information processing method according to the second aspect or each possible embodiment of the second aspect.

In a seventh aspect, the present disclosure provides a computer-readable storage medium. The computer-readable storage medium has a computer program stored thereon. The computer program, when executed by a processor, implements the information processing method according to the first aspect or each possible embodiment of the first aspect, or the second aspect or each possible embodiment of the second aspect.

In the information processing method and apparatus, the device, and the storage medium according to the present disclosure, after the target information, the session identifier of the source session group, and the indication information that are transmitted by the server are received by the client, when the indication information indicates the type of the source session group, during the rendering and display of target information on the client, the display range of the target information and the operation permission of the target information can be determined based on the indication information and the session identifier of the source session group. Then, the target information in the target session is rendered and displayed based on the display range of the target information and the operation permission of the target information. Therefore, different ranges of the target information and different operation permission of the target information are displayed for different types of source session groups. Furthermore, for different users, the displayed views corresponding to the to-be-forwarded information are the same expect the display range and the operation permission. In this way, the forwarded information can be flexibly displayed based on the type of the source session group.

BRIEF DESCRIPTION OF THE DRAWINGS

FIG. 3 is an interaction flowchart of an information processing method according to an embodiment of the present disclosure.

FIG. 12 is a flowchart of a specific implementation of rendering and displaying the target information in the target session by the target client.

DETAILED DESCRIPTION

Figure 1:
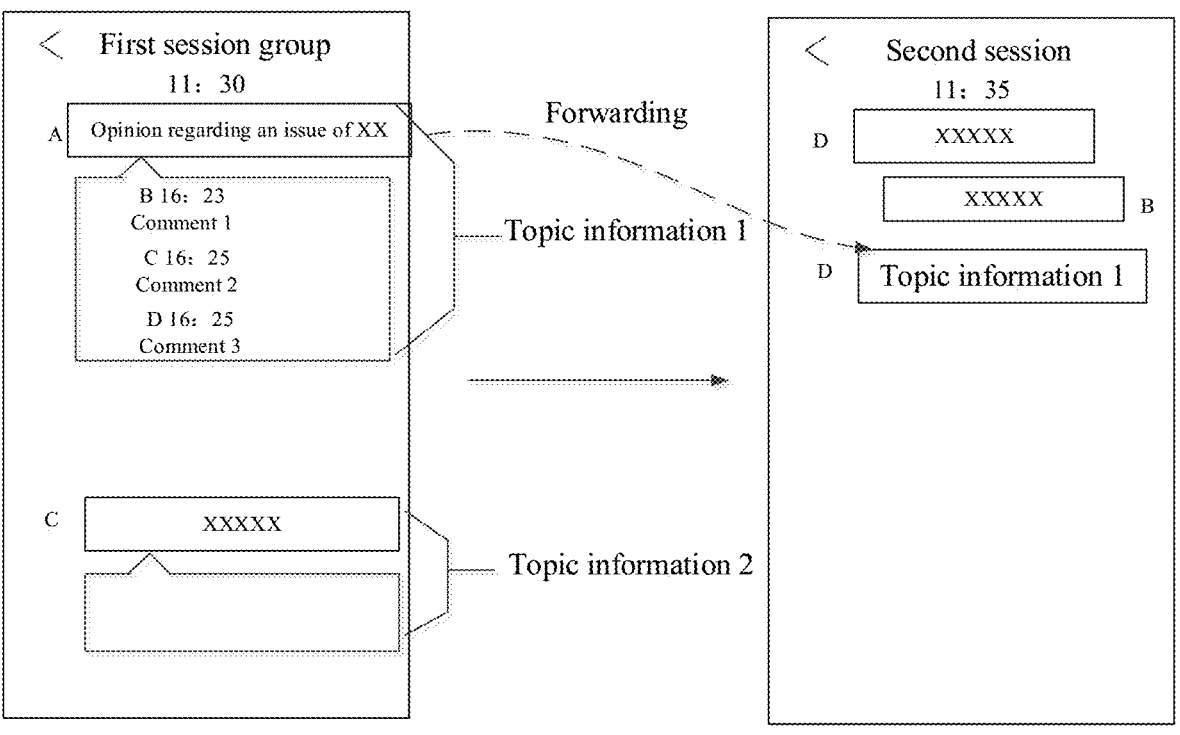
FIG. 1 is a schematic diagram showing an application scenario of an information processing method according to an embodiment of the present disclosure.

The embodiments of the present disclosure will be described in detail below with reference to examples thereof as illustrated in the accompanying drawings. The embodiments described below with reference to the drawings are illustrative only, and are intended to explain rather than limit the present disclosure.

Terms such as "first" and "second" in the description of the embodiments of the present disclosure, the appended claims, and the accompanying drawings are used to distinguish similar objects, rather than to describe a specific sequence or order. It should be understood that data used in this way can be interchanged with each other under appropriate circumstances, such that the described embodiments of the present disclosure can be implemented in a sequence other than those illustrated in the figures or described in the present disclosure. In addition, the terms "including" and "having" and any variants thereof as used in the description of the embodiments of the present disclosure, the appended claims, and the above accompanying drawings are intended to cover non-exclusive inclusions. For example, a process, method, system, product, or device that includes a series of steps or units is not necessarily limited to those explicitly listed steps or units, but may also include other steps or units that are not explicitly listed or are inherent to the process, method, product, or device.

First, some of the terms in the embodiments of the present disclosure are explained below for understanding by those skilled in the art.

The term "group" refers to a set of a plurality of users for IM that is maintained on a server with information (e.g., all users within the group) of the group and additional applications such as a sharing space and discussion community. The group includes a common group and a topic group. Information published by each user in the common group is one piece of information, and information published by each user in the topic group is a post. Other members in the topic group can perform operations such as a reply, a comment, forwarding, a subscription on the post, and the topic group can record and display the post and operation information (e.g., the reply, a like, the comment) of the post by the user. The topic group is classified into a public group and a private group.

The term "session" refers to that carrying of information received and transmitted by two or more users performing the IM during the IM. For example, a session is established between a user A and a user B through their respective IM clients via an IM server. For example, a session is established between the user A and several users through their respective IM clients via the IM server, and an establishment and revocation of the session may be initiated by any terminal of the IM.

An IM application supports the user to forward the post of the public topic group or the private topic group to other group sessions or single chat sessions. Since the topic group includes two different types of the public group and the private group, when the post of the private group is forwarded to other sessions for display, the embodiments of the present disclosure provide an information processing method and apparatus, a device, and a storage medium in order to solve a problem of how to flexibly display the information of the forwarded post based on the type of the topic group. After the information forwarding request transmitted by the client is received by the server, the information forwarding request carries the to-be-forwarded information from the source session group, the identifier of the target session, and the type of the source session group. The target information is generated based on the to-be-forwarded information, and then the target information, the session identifier of the source session group, and indication information are transmitted to the target client corresponding to the user in the target session. Since the indication information can indicate the type of the source session group (such as the public group or the private group), when the target information is rendered and displayed by the target client, the display range of the target information and the operation permission of the target information can be determined based on the indication information and the session identifier of the source session group. Then, the target information is rendered and displayed based on the display range of the target information and the operation permission of the target information. Therefore, different ranges and operation permission of the target information are displayed for different types of source session groups. Furthermore, with regard to different users, the displayed views corresponding to the to-be-forwarded information are the same expect the display range and the operation permission. In this way, the forwarded information can be flexibly displayed based on the type of the source session group.

Next, an example of an application scenario involved in the embodiments of the present disclosure will be described below.

The information processing method according to the embodiments of the present disclosure may be at least applied to the following application scenario and will be described below in conjunction with the accompanying drawings.

Exemplarily, FIG. 1 is a schematic diagram showing an application scenario of an information processing method according to an embodiment of the present disclosure. As illustrated in FIG. 1, a first session group displayed by a current IM client has two pieces of topic information (a topic information 1 and a topic information 2, which are published by a user A and a user C, respectively). A user D in the first session group needs to forward the topic information 1 published by the user A into a second session for a user in the second session to view the topic information 1. The second session may be a session of two users or a group session, and the first session group may be a public group or a private group. All users in the second session can view the topic information 1 after the topic information 1 is forwarded to the second session. However, in a case where the first session group is the private group, when the IM client running on a terminal device used by the user in the second session displays the topic information 1 based on the type of the first session group, the information processing method according to the present disclosure can be used to ensure information security during the displaying of the topic information 1. It should be noted that the scenario illustrated in FIG. 1 is merely an example, and the information processing method according to the present disclosure may also be applied to other similar scenarios, which is not limited in the present disclosure.

The technical solutions of the present disclosure and how the technical solutions of the present disclosure solve the above-mentioned technical problem will be described in detail below with specific embodiments. The following several specific embodiments may be combined with each other, and the detailed description of the same or similar concepts or processes may be omitted in some embodiments. The embodiments of the present disclosure will be described below with reference to the accompanying drawings.

Figure 2:
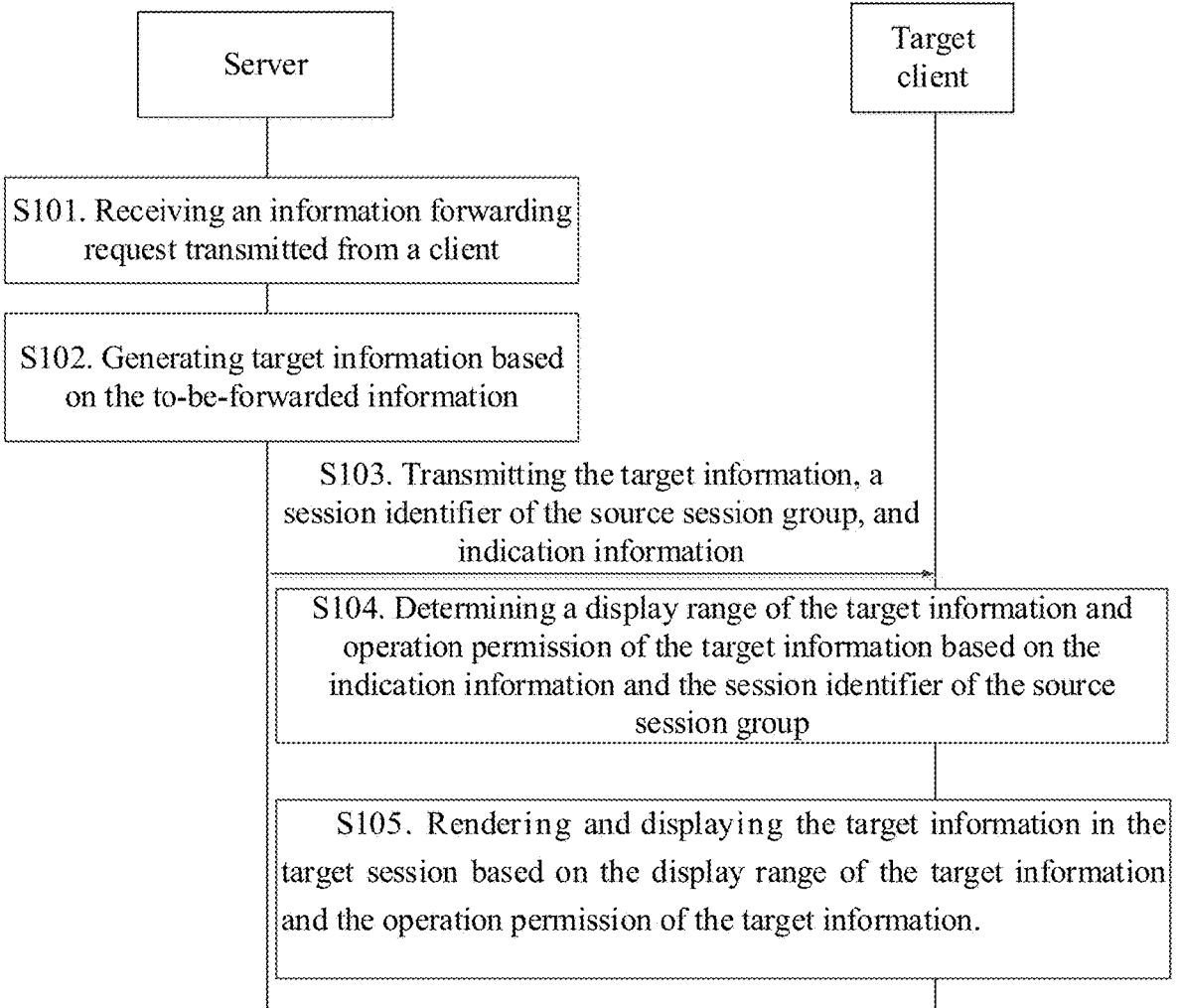
FIG. 2 is an interaction flowchart of an information processing method according to an embodiment of the present disclosure.

FIG. 2 is an interaction flowchart of an information processing method according to an embodiment of the present disclosure. As illustrated in FIG. 2, the method in the embodiment may include actions at blocks S101 to S105.

At bock S101, an information forwarding request transmitted by a client is received by a server. The information forwarding request carries to-be-forwarded information from a source session group, an identifier of a target session, and a type of the source session group.

The client in the embodiments of the present disclosure is an IM client (hereinafter referred to as a client). Each of terminal devices on all user sides of one session (including the source session group and the target session) has the IM client run thereon. A session is established by IM clients of different users in the session through the server. The IM client is in communication with the server based on an agreed communication protocol.

In an embodiment, the client herein is a client running on a terminal device used by a user who triggers forwarding of the to-be-forwarded information from the source session group to the target session, and the to-be-forwarded information is information published by any user in the source session group. In an embodiment, the source session group may be a topic group. Correspondingly, information published by any user in the source session group is a post, and the other members in the source session group may perform operations such as a reply, a comment, forwarding, a subscription. In this case, the to-be-forwarded information is a to-be-forwarded post and includes the original information and the operation information on the original information by the user. The operation information may include at least one of the reply, a like, the comment, the forwarding, or the subscription. In an embodiment, the source session group may also be the common group. The to-be-forwarded information is information published by any user in the source session group when the source session group is the common group.

When forwarding information is triggered by the user, for example, to-be-forwarded information is selected (by moving a mouse to the to-be-forwarded information or by placing a finger on the to-be-forwarded information through the touch screen) by a user in the source session group, in response to the operation of the user, a page is controlled by the client to pop up operation box options for the to-be-forwarded information. When a "Forward" item in the operation box options is then selected by the user, in response to the operation of the user, a session option is displayed on the client for the user to select the target session. One or more sessions may be selected by the user as the target session, and the target session may be a one-to-one session or a group session. After the target session is selected by the user, i.e., forwarding of the to-be-forwarded information by the user is trigged, the information forwarding request is generated on the client. The information forwarding request carries the to-be-forwarded information from the source session group, the identifier of the target session, and the type of the source session group.

In the embodiments of the present disclosure, the type of the source session group may include the public group and the private group. The public group refers to that an attribute of the group is public. Any user may join the group, and information of the public group is also public. The private group refers to that an attribute of the group is private. Verification of an administrator of the group is required to join the private group, and public information of the group may only be viewed by a user in the group. The type of the source session group may be set by the user when created by the user through the client and may be altered by the user later. The type of the source session group can be stored into the client.

At block S102, target information is generated by the server based on the to-be-forwarded information.

In an implementation, the target information may be information of a nested structure. When the information of the nested structure is displayed, only a transmitting time point, a title, and a source of the to-be-forwarded information may be displayed, and a specific information content is hidden. The specific information content may be displayed when a viewing instruction triggered by the user is received. By generating the target information of the nested structure, a small page occupation is facilitated during the display. The user can know overview information of the to-be-forwarded information through displayed information, and then a specific content is displayed when the specific content is required to be known. In this way, efficiency of obtaining the information for the user is improved. It should be noted that the target information may further be information of other structures, which is not limited in the embodiments of the present disclosure.

At block S103, the target information, a session identifier of the source session group, and indication information are transmitted to a target client corresponding to a user in the target session. The indication information indicates the type of the source session group.

In an embodiment, the information forwarding request received by the server carries the type of the source session group, and the indication information may be transmitted by the server to the target client based on the type of the source session group to indicate the type of the source session group. In an embodiment, the indication information is first information when the type of the source session group is a first type group such as the public group, and the indication information is second information when the type of the source session group is a second type group such as the private group. For example, the first information is "0", and the second information is "1". In another implementation, no indication information is transmitted when the type of the source session group is the first type group such as the public group, and predetermined indication information is transmitted when the type of the source session group is the second type group such as the private group.

When the source session group is created, the session identifier of the source session group is stored on the server and may be directly obtained by the server.

The target client corresponding to the user in the target session is a client running on the terminal device used by all the users in the target session.

At block S104, after the target information, the session identifier of the source session group, and the indication information that are transmitted by the server are received by the target client, a display range of the target information and operation permission of the target information are determined based on the indication information and the session identifier of the source session group.

In an implementation, when the indication information indicates that the source session group is the private group, in a case where the user corresponding to the client in the target session is the user in the source session group, it is determined that the display range of the target information is a second display range and the operation permission of the target information is second operation permission; and in a case where the user corresponding to the client in the target session is not the user in the source session group, it is determined that the display range of the target information is a third display range, and the operation permission of the target information is third operation permission. The second display range is greater than the third display range. In the embodiment, when the target information generated by the to-be-forwarded information from the private group is displayed in the target session, the display range of the target information when the user corresponding to the client in the target session is the user in the private group is greater than the display range of the target information when the user corresponding to the client in the target session is not the user in the private group. Therefore, information security of the to-be-forwarded information from the private topic group can be ensured to a certain extent, and user experience and the information security are considered.

In an implementation, the action at block S104 may further include actions at blocks S1041 to S1044.

At block S1041, the display range of the target information is determined as a first display range, and the operation permission of the target information is determined as first operation permission, when the indication information is first information.

In an embodiment, the first information is used to indicate that the source session group is a public group, and the second information is used to indicate that the source session group is a private group. When the source session group is the topic group, the first information indicates that the source session group is the public topic group, and the second information indicates that the source session group is the private topic group.

For example, the indication information being the first information indicates that the type of the source session group is the first type group such as the public group. In this case, the display range of the target information is determined as the first display range, and the operation permission of the target information is determined as the first operation permission.

At block S1042, it is determined, based on the session identifier of the source session group, whether a receiver user in the target session is a user in the source session group, when the indication information is second information.

For example, the indication information being the second information indicates that the type of the source session group is the second type group such as the private group. In this case, it is necessary to determine, based on the session identifier of the source session group, whether the receiver user in the target session is the user in the source session group. It should be understood that when the receiver user in the target session is the user in the source session group, there is no need to set the display range of the target information and the operation permission of the target information for the user; and when the receiver user in the target session is not the user in the source session group, it is necessary to set display range of the target information and the operation permission of the target information for the user since the source session group is the private group.

At block S1043, the display range of the target information is determined as a second display range, and the operation permission of the target information is determined as second operation permission, in response to determining that the receiver user in the target session is the user in the source session group.

At block S1044, the display range of the target information is determined as a third display range, and the operation permission of the target information is determined as third operation permission, in response to determining that the receiver user in the target session is not the user in the source session group.

At block S105, the target information in the target session is rendered and displayed by the target client based on the display range of the target information and the operation permission of the target information.

In the embodiment, since the target information is information of the nested structure, a nested structure of two levels is taken as an example in the embodiment. In an embodiment, the target information includes first-level information and second-level information. The display range of the target information includes a display range of the first-level information and a display range of the second-level information, and the operation permission of the target information includes operation permission of the first-level information and operation permission of the second-level information. It should be understood that when the target information is a nested structure of three levels or more, the display range of the target information may include a display range of each level information, and the operation permission of the target information may include the operation permission of each level information.

When the target information includes the first-level information and the second-level information, the action at block S105 may further include actions at blocks S1051 and S1052.

At block S1051, the first-level information is rendered to generate a first view, the first view is displayed based on the display range of the first-level information, and operation permission of the first view is set based on the operation permission of the first-level information.

At block S1052, in response to a clicking operation on the first view by the user, the second-level information is rendered to generate a second view, the second view on a current interface is displayed based on the display range of the second-level information, and operation permission of the second view is set based on the operation permission of the second-level information.

In an implementation, the first-level information includes a name of the source session group and a title determined based on the to-be-forwarded information. The second-level information includes the to-be-forwarded information. The to-be-forwarded information includes original information and operation information on the original information by the user. That is, the first-level information includes overview information of the to-be-forwarded information, and the second-level information is a specific content of the to-be-forwarded information.

Correspondingly, in the first display range, the display range of the first-level information includes displaying the name of the source session group in the first view, and the operation permission of the first-level information includes clicking the first view to jump to the second view.

In the second display range, the display range of the first-level information includes displaying the name of the source session group in the first view, and the operation permission of the first-level information includes clicking the first view to jump to the second view.

In the third display range, the display range of the first-level information includes hiding the name of the source session group in the first view, and the operation permission of the first-level information includes clicking the first view to jump to the second view.

Correspondingly, in the first display range, the display range of the second-level information includes displaying, in the second view, the original information contained in the to-be-forwarded information and real-time operation information on the original information by the user, and the operation permission of the second-level information includes performing a predetermined operation on the to-be-forwarded information in the second view.

In the first display range, the display range of the second-level information includes displaying, in the second view, the original information included in the to-be-forwarded information and the real-time operation information on the original information by the user. That is, in the second view, the operation information on the original information by the user in the source session group may also be displayed after the to-be-forwarded information is forwarded. In an exemplary implementation, in response to determining, by the server, that the type of the source session group is the first type group such as the public group, the sever can determine a link of the to-be-forwarded information as the second-level information of the target information when the target information is generated based on the to-be-forwarded information. Therefore, the real-time operation information on the original information by the user may be displayed by the target client when the second view is displayed by the target client.

In the second display range, the display range of the second-level information includes displaying, in the second view, the original information contained in the to-be-forwarded information and the real-time operation information on the original information by the user, and the operation permission of the second-level information includes performing the predetermined operation on the to-be-forwarded information in the second view.

In the third display range, the display range of the second-level information includes displaying, in the second view, the original information contained in the to-be-forwarded information and operation information on the original information by the user prior to the to-be-forwarded information being forwarded, and the operation permission of the second-level information includes performing no predetermined operation on the to-be-forwarded information in the second view.

In an embodiment, the predetermined operation includes at least one of a reply, a like, a comment, forwarding, or a subscription.

In the above-mentioned implementations, a difference between the second display range and the third display range is in different display ranges of the second-level information and different operation permission of the second-level information. A difference between the display ranges of the second-level information is that in the second display range, the original information contained in the to-be-forwarded information and the real-time operation information on the original information by the user are displayed in the second view, while in the third display range, the original information contained in the to-be-forwarded information and the operation information on the original information by the user prior to the to-be-forwarded information being forwarded are displayed in the second view. In an exemplary implementation, in response to determining, by the server, that the type of the source session group is the second type group such as the private group, target information of two types may be generated by the server when the target information is generated based on the to-be-forwarded information. A difference between the target information of the two types is in the different second-level information. For example, the first target information and the second information are generated, the second-level information of the first target information is the link of the to-be-forwarded information, and the second-level information of the second target information is the original information contained in the to-be-forwarded information and the historical operation information on the original information by the user. The server can transmit the target information of two types and carry the user type indication when transmitting the target information. For example, the first target information carries a first user type indication, which for example indicates that a user is the user in the source session group, and the second target information carries the second user type indication, which for example indicates that a user is not the user in the source session group. As another implementation, when the target information is generated by the server based on the to-be-forwarded information, the generated second-level information is a link of the to-be-forwarded information. During the displaying of the target client, when it is determined that the display range of the target information is the third display range, operation information on the original information by the user after the to-be-forwarded information is forwarded is not displayed.

In an embodiment, in the first display range, the second display range, and the third display range, the display range of the second-level information further includes displaying, in the second view, overview information of the to-be-forwarded information and a source of the to-be-forwarded information. By displaying the overview information of the to-be-forwarded information and the source of the to-be-forwarded information, the source or traceability of the information may be available to the user conveniently.

It should be noted that in the above-mentioned implementations of the embodiment, the first display range and the second display range are the same. In an embodiment, the first display range and the second display range may be different, and therefore the user can easily distinguish the source of the to-be-forwarded information, i.e., the type of the source session group.

In the information processing method according to the embodiment, after the target information, the session identifier of the source session group, and the indication information that are transmitted by the server are received by the client, when the indication information indicates the type of the source session group, during the rendering and display of target information on the client, the display range of the target information and the operation permission of the target information are determined based on the indication information and the session identifier of the source session group.

Then, the target information in the target session is rendered and displayed based on the display range of the target information and the operation permission of the target information. Therefore, different ranges of the target information and different operation permission of the target information are displayed for different types of source session groups. Furthermore, for different users, the displayed views corresponding to the to-be-forwarded information are the same expect the display range and the operation permission. In this way, the forwarded information can be flexibly displayed based on the type of the source session group.

A detailed process of the information processing method according to the present disclosure will be described below with reference to a specific embodiment.

FIG. 3 is an interaction flowchart of an information processing method according to an embodiment of the present disclosure. As illustrated in FIG. 3, the method in this embodiment may include actions at blocks S201 to S205.

At block S201, in response to an operation triggered by a user in a source session group to forward to-be-forwarded information to a target session, an information forwarding request is transmitted form the client to a server. The information forwarding request carries to-be-forwarded information from the source session group, an identifier of the target session, and a type of the source session group.

In an embodiment, the client herein is a client running on a terminal device used by a user who triggers forwarding of the to-be-forwarded information from the source session group to the target session. The to-be-forwarded information is the information published by any user in the source session group. The source session group may be a topic group. The information published by any user in the source session group is a post, and the other members in the source session group may perform operations such as a reply, a comment, forwarding, a subscription. In this case, the to-be-forwarded information is the to-be-forwarded post and includes the original information and the operation information on the original information by the user.

In the embodiment, the type of the source session group including the public group and the private group is taken as an example.

At block S202, target information is generated by the server based on the to-be-forwarded information. The target information is information of a nested structure.

In the embodiment, the target information including a first-level information and a second-level information is taken as an example for description. The first-level information includes a name of the source session group and a title determined based on the to-be-forwarded information. The second-level information includes the to-be-forwarded information. The to-be-forwarded information includes original information and operation information on the original information by the user. That is, the first-level information includes overview information of the to-be-forwarded information, and the second-level information is specific content of the to-be-forwarded information.

In the embodiment, the second-level information is a link of the to-be-forwarded information.

At block S203, the target information, a session identifier of the source session group, and indication information are transmitted by the server to a target client corresponding to a user in the target session. The indication information indicates a type of the source session group.

In the embodiment, the target client corresponding to the user in the target session is the client running on the terminal device used by all the users in the target session. In the embodiment, when it is determined, by the server, that the type of the source session group is the public group, the transmitted indication information is the first information, and when it is determined, by the server, that the type of the source session group is the private group, the transmitted indication information is the second information.

At block S204, after the target information, the session identifier of the source session group and the indication information that are transmitted by the server are received by the target client, the display range of the target information and the operation permission of the target information are determined based on the indication information and the session identifier of the source session group.

At block S205, the target information is rendered and displayed by the target client in the target session based on the display range of the target information and the operation permission of the target information.

In an embodiment, the action at block S205 may further include: rendering the first-level information to generate a first view, displaying the first view based on the display range of the first-level information, and setting operation permission of the first view based on the operation permission of the first-level information; and rendering, in response to a clicking operation on the first view by a user, the second-level information to generate a second view, displaying the second view on a current interface based on the display range of the second-level information, and setting operation permission of the second view based on the operation permission of the second-level information.

In an implementation, the display range of the target information and the operation permission of the target information generally includes the following three types.

For the first type, when the indication information is first information, the display range of the target information is determined as a first display range, and the operation permission of the target information is determined as first operation permission.

In the first display range, the display range of the first-level information includes displaying the name of the source session group in the first view, and the operation permission of the first-level information includes clicking the first view to jump to the second view. The display range of the second-level information includes displaying, in the second view, the original information contained in the to-be-forwarded information and real-time operation information on the original information by the user, and the operation permission of the second-level information includes performing a predetermined operation on the to-be-forwarded information in the second view.

Figure 4:
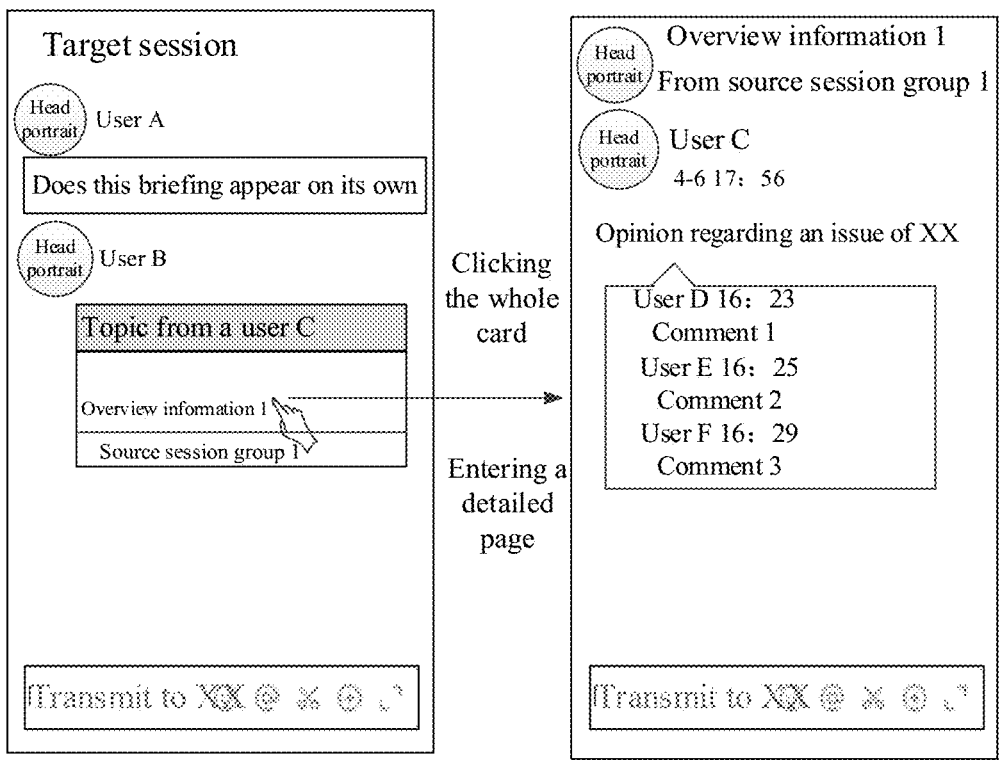
FIG. 4 is a schematic diagram showing that to-be-forwarded information from a public group is displayed in a target session after forwarded to the target session according to an embodiment of the present disclosure.

FIG. 4 is a schematic diagram showing that to-be-forwarded information from a public group is displayed in a target session after being forwarded to the target session according to an embodiment of the present disclosure. FIG. 4 illustrates a display result corresponding to the first display range. The first view is displayed on the left side is. A name (a source session group 1 as illustrated in FIG. 4) of the source session group, a title of the to-be-forwarded information (a topic from a user C as illustrated in FIG. 4) and overview information (overview information 1 in the first view as illustrated in FIG. 4) of the to-be-forwarded information are displayed in the first view. The operation permission of the first-level information may include clicking the first view to jump to the second view. In an embodiment, as illustrated in FIG. 4, the first view is a card. For example, the whole card may be clicked (for example, clicking any position on the card) to jump to the second view, and a detail page is entered. In an embodiment, the operation permission of the first-level information may further include clicking the name of the source session group to jump to a home page of the source session group. A new user automatically joins the source session group.

The second view is displayed on the right side. The original information contained in the to-be-forwarded information ("Opinion regarding an issue of XX", a publisher "user C", and a published time point as illustrated in FIG. 4) and the real-time operation information (a comment from each of a user D, a user E, and a user F as illustrated in FIG. 4) on the original information by the user are displayed in the second view. In an embodiment, the overview information (overview information 1 in the second view as illustrated in FIG. 4) of the to-be-forwarded information and the source of the to-be-forwarded information ("From a source session group 1" in the second view as illustrated in FIG. 4) may further be displayed in the second view. By displaying the overview information of the to-be-forwarded information and the source of the to-be-forwarded information, the source or traceability of the information may be available to the user conveniently. The operation permission of the second-level information includes performing a predetermined operation on the to-be-forwarded information in the second view. In an embodiment, the predetermined operation may be any operation, such as the reply, the like, the forwarding, and the subscription. In an embodiment, a user of a non-source session group may automatically join the source session group after replying to the to-be-forwarded information.

For the second type, when the indication information is second information, in response to determining that the receiver user in the target session is the user in the source session group, the display range of the target information is determined as a second display range, and the operation permission of the target information is determined as second operation permission.

In the second display range, the display range of the first-level information includes displaying the name of the source session group in the first view, and the operation permission of the first-level information includes clicking the first view to jump to the second view. The display range of the second-level information includes displaying, in the second view, the original information contained in the to-be-forwarded information and the real-time operation information on the original information by the user, and the operation permission of the second-level information includes performing the predetermined operation on the to-be-forwarded information in the second view.

Figure 5:
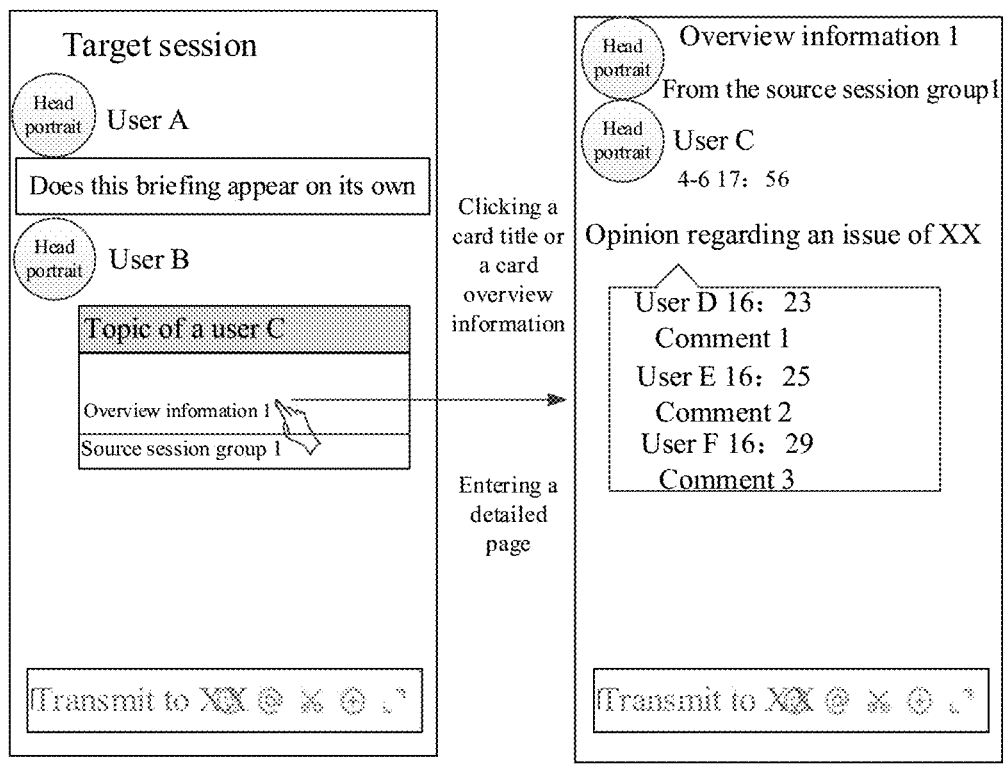
FIG. 5 is a schematic diagram showing that to-be-forwarded information from a private group is displayed in a target session after forwarded to the target session according to an embodiment of the present disclosure.

FIG. 5 is a schematic diagram showing that to-be-forwarded information from a private group is displayed in a target session after forwarded to the target session according to an embodiment of the present disclosure. FIG. 5 illustrates a display result corresponding to a second display range. The first view is displayed at the left side. A name (a source session group 1 as illustrated in FIG. 5) of the source session group, a title (a topic from a user C as illustrated in FIG. 5) of the to-be-forwarded information and overview information (overview information 1 in the first view as illustrated in FIG. 5) of the to-be-forwarded information are displayed in the first view. The operation permission of the first-level information may include clicking the first view to jump to the second view. In an embodiment, as illustrated in FIG. 5, the first view is a card. A card title or card overview information may be clicked to jump to the second view, and a detail page is entered. In an embodiment, the operation permission of the first-level information may further include clicking the name of the source session group to jump to a home page of the source session group.

The second view is displayed on the right side. The original information contained in the to-be-forwarded information ("Opinion regarding an issue of XX", a publisher "user C", and a published time point as illustrated in FIG. 5), and the real-time operation information (a comment from each of a user D, a user E, and a user F as illustrated in FIG. 5) on the original information by the user are displayed in the second view. In an embodiment, in the second view, the overview information of the to-be-forwarded information (such as the overview information 1 in the second view as illustrated in FIG. 4) and the source of the to-be-forwarded information (the "From a source session group 1" in the second view as illustrated in FIG. 4) may further be displayed in the second view. By displaying the overview information of the to-be-forwarded information and the source of the to-be-forwarded information, the source or traceability of the information may be available to the user conveniently. The operation permission of the second-level information includes performing a predetermined operation on the to-be-forwarded information in the second view. In an embodiment, the predetermined operation may be any operation, such as the reply, the like, the forwarding, and the subscription.

For the third type, when the indication information is the second information, in response to determining that the receiver user in the target session is not the user in the source session group, the display range of the target information is determined as a third display range, and the operation permission of the target information is determined as third operation permission.

In the third display range, the display range of the first-level information includes hiding the name of the source session group in the first view, and the operation permission of the first-level information includes clicking the first view to jump to the second view. The display range of the second-level information includes displaying, in the second view, the original information contained in the to-be-forwarded information and operation information on the original information by the user prior to the to-be-forwarded information being forwarded, and the operation permission of the second-level information includes performing no predetermined operation on the to-be-forwarded information in the second view.

Figure 6:
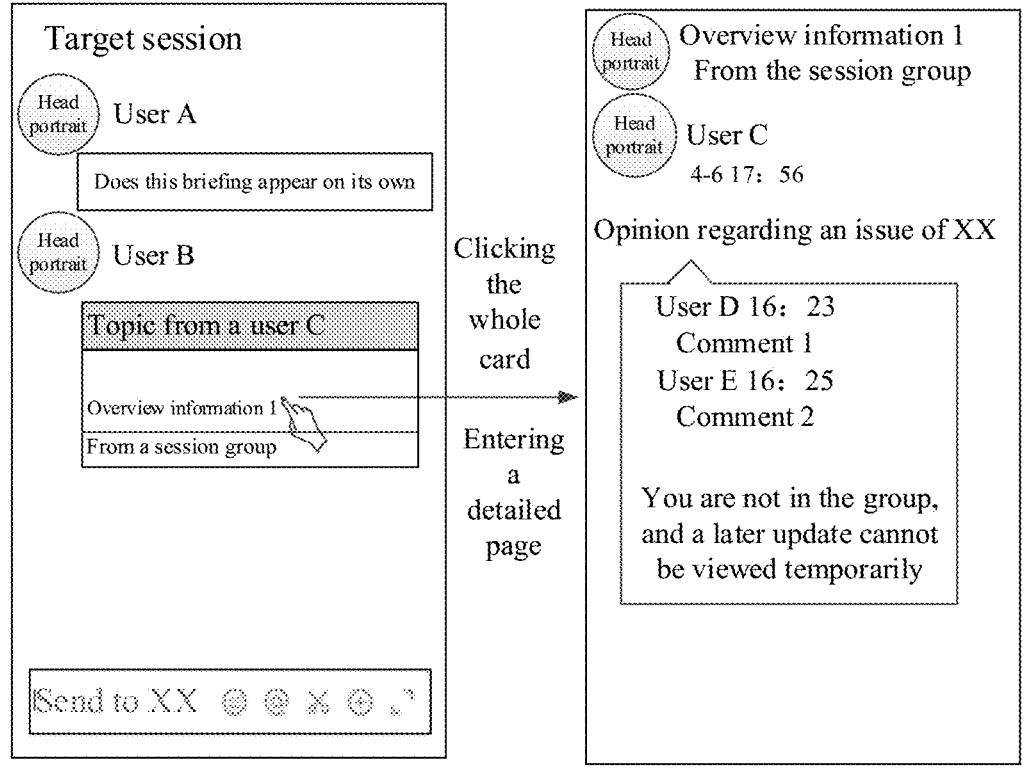
FIG. 6 is a schematic diagram showing that to-be-forwarded information from a private group is displayed in a target session after forwarded to the target session according to an embodiment of the present disclosure.

FIG. 6 is a schematic diagram showing that to-be-forwarded information from a private group is displayed in a target session after forwarded to the target session according to an embodiment of the present disclosure. FIG. 6 illustrates a display result corresponding to a third display range. The first view is displayed on the left side. A name (as illustrated FIG. 6, only "From a topic group" is displayed without the name of the source session group) of the source session group, a title (a topic from user C as illustrated in FIG. 6) of the to-be-forwarded information and overview information (overview information 1 in the first view as illustrated in FIG. 6) of the to-be-forwarded information are hided in the first view. It should be noted that when the user in the target session is not the user in the source session group and the source session group is the private group, "From the topic group" is displayed in the first view. The operation permission of the first-level information may include clicking the first view to jump to the second view. In an embodiment, as illustrated in FIG. 6, the first view is a card. The whole card may be clicked (for example, clicking any position on the card) to jump to the second view, and a detail page is entered. The second view is displayed on the right side. The original information (as illustrated in FIG. 6, "Opinion regarding a XX issue", a publisher "user C", and a published time point) contained in the to-be-forwarded information and operation information (for example, a comment from each of a user D and a user E as illustrated in FIG. 6) on the original information by the user prior to the to-be-forwarded information being forwarded are displayed in the second view. For example, a comment from a user F is operation information on the original information by the user after being forwarded. In this case, the comment from the user F is not displayed, and prompt information is displayed as "You are not in the group, and a later update cannot be viewed temporarily. In an embodiment, in the second view, the overview information (overview information 1 in the second view as illustrated in FIG. 6) of the to-be-forwarded information and the source ("From a source session group" in the second view as illustrated in FIG. 6) of the to-be-forwarded information may further be displayed. By displaying the overview information of the to-be-forwarded information and the source of the to-be-forwarded information, the source or traceability of the information may be available to the user conveniently. The operation permission of the second-level information includes performing no predetermined operation on the to-be-forwarded information in the second view. As illustrated in FIG. 6, no input box is displayed.

The following are apparatus embodiments of the present disclosure, which may be configured to perform the above-mentioned method embodiments of the present disclosure. For details not disclosed in the apparatus embodiments of the present disclosure, reference may be made to the above-mentioned method embodiments of the present disclosure.

Figure 7:
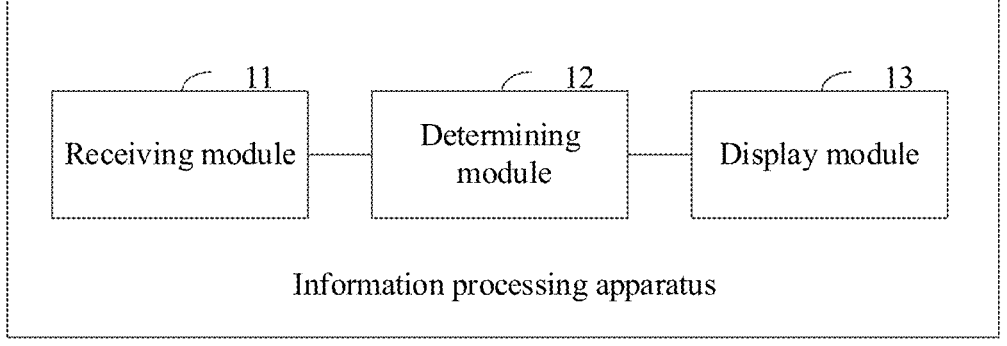
FIG. 7 is a schematic diagram showing a structure of an information processing apparatus according to an embodiment of the present disclosure.

FIG. 7 is a schematic diagram showing a structure of an information processing apparatus according to an embodiment of the present disclosure. As illustrated in FIG. 7, the apparatus in the embodiment may include a receiving module 11, a determining module 12, and a display module 13. The receiving module 11 is configured to receive target information, a session identifier of a source session group, and indication information that are transmitted by a server. The target information is generated based on to-be-forwarded information from the source session group, and the indication information indicates a type of the source session group. The determining module 12 is configured to determine a display range of the target information and operation permission of the target information based on the indication information and the session identifier of the source session group. The display module 13 is configured to render and display the target information in a target session based on the display range of the target information and the operation permission of the target information.

In an embodiment, the first information indicates that the source session group is a public group, and the second information indicates that the source session group is a private group.

In an embodiment, the source session group is a topic group, and the to-be-forwarded information includes original information and operation information on the original information by the user.

In an embodiment, the target information is information of a nested structure.

In an embodiment, the determining module 12 is further configured to: determine the display range of the target information as a first display range and determine the operation permission of the target information as first operation permission, when the indication information is first information; determine, based on the session identifier of the source session group, whether a receiver user in the target session is a user in the source session group, when the indication information is second information; determine the display range of the target information as a second display range and determine the operation permission of the target information as second operation permission, in response to determining that the receiver user in the target session is the user in the source session group; and determine the display range of the target information as a third display range and determine the operation permission of the target information as third operation permission, in response to determining that the receiver user in the target session is not the user in the source session group.

In an embodiment, the target information includes first-level information and second-level information. The display range of the target information includes a display range of the first-level information and a display range of the second-level information. The operation permission of the target information includes operation permission of the first-level information and operation permission of the second-level information.

In an embodiment, the display module 13 is further configured to: render the first-level information to generate a first view, display the first view based on the display range of the first-level information, and set operation permission of the first view based on the operation permission of the first-level information; and render, in response to a clicking operation on the first view by a user, the second-level information to generate a second view, display the second view on a current interface based on the display range of the second-level information, and set operation permission of the second view based on the operation permission of the second-level information.

In an embodiment, the first-level information includes a name of the source session group and a title determined based on the to-be-forwarded information. The second-level information includes the to-be-forwarded information. The to-be-forwarded information includes original information and operation information on the original information by the user.

In an embodiment, in the first display range, the display range of the first-level information includes displaying the name of the source session group in the first view, and the operation permission of the first-level information includes clicking the first view to jump to the second view. In the second display range, the display range of the first-level information includes displaying the name of the source session group in the first view, and the operation permission of the first-level information includes clicking the first view to jump to the second view. In the third display range, the display range of the first-level information includes hiding the name of the source session group in the first view, and the operation permission of the first-level information includes clicking the first view to jump to the second view.

In an embodiment, in the first display range, the display range of the second-level information includes displaying, in the second view, the original information contained in the to-be-forwarded information and real-time operation information on the original information by the user, and the operation permission of the second-level information includes performing a predetermined operation on the to-be-forwarded information in the second view. In the second display range, the display range of the second-level information includes displaying, in the second view, the original information contained in the to-be-forwarded information and the real-time operation information on the original information by the user, and the operation permission of the second-level information includes performing the predetermined operation on the to-be-forwarded information in the second view. In the third display range, the display range of the second-level information includes displaying, in the second view, the original information contained in the to-be-forwarded information and operation information on the original information by the user prior to the to-be-forwarded information being forwarded, and the operation permission of the second-level information includes performing no predetermined operation on the to-be-forwarded information in the second view.

In an embodiment, the predetermined operation includes at least one of a reply, a like, a comment, forwarding, or a subscription.

In an embodiment, in the first display range, the second display range, and the third display range, the display range of the second-level information further includes displaying, in the second view, overview information of the to-be-forwarded information and a source of the to-be-forwarded information.

The apparatus according to the embodiment of the present disclosure can perform the above-mentioned method, a specific implementation principle and technical effect thereof may refer to the above-mentioned method embodiments, and details thereof will be omitted herein.

Figure 8:
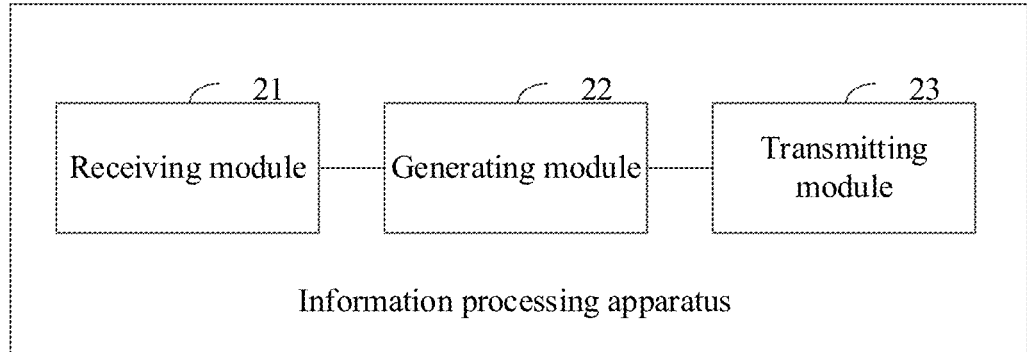
FIG. 8 is a schematic diagram showing a structure of an information processing apparatus according to an embodiment of the present disclosure.

FIG. 8 is a schematic diagram showing a structure of an information processing apparatus according to an embodiment of the present disclosure. As illustrated in FIG. 8, the apparatus in the embodiment may include a receiving module 21, a generating module 22, and a transmitting module 23. The receiving module 21 is configured to receive an information forwarding request transmitted by a client. The information forwarding request carries to-be-forwarded information from a source session group, an identifier of a target session, and a type of the source session group. The generating module 22 is configured to generate target information based on the to-be-forwarded information. The transmitting module 23 is configured to transmit the target information, a session identifier of the source session group, and indication information to a target client corresponding to a user in the target session. The indication information indicates a type of the source session group to allow the target client to determine a display range of the target information and operation permission of the target information based on the indication information and the session identifier of the source session group and render and display the target information in the target session based on the display range of the target information and the operation permission of the target information.

In an embodiment, the target information includes first-level information and second-level information. The display range of the target information includes a display range of the first-level information and a display range of the second-level information. The operation permission of the target information includes operation permission of the first-level information and operation permission of the second-level information.

In an embodiment, the first-level information includes a name of the source session group and a title determined based on the to-be-forwarded information. The second-level information includes the to-be-forwarded information. The to-be-forwarded information includes original information and operation information on the original information by the user.

The apparatus according to the embodiment of the present disclosure can perform the above-mentioned method, the specific implementation principle and technical effect thereof may refer to the above-mentioned method embodiments, and details thereof will be omitted herein.

It should be noted that the modules of the above-mentioned apparatuses are merely divided according to logic functions, and can be entirely or partially integrated into a physical entity or physically separated from each other in an actual implementation. These modules can all be implemented in a form of software invoked by processing elements, or can all be implemented in a form of hardware, or can be partially implemented in the form of software invoked by the processing elements and partially implemented in the form of hardware. For example, the processing module may be a processing element set up alone, or may be integrated in one of the chips of the above apparatus. In addition, the processing module may also be stored in the memory of the above apparatus in a form of program codes. One of the processing elements of the above apparatus invokes and performs the above determined functions of the processing module. Other modules are implemented in a similar way to that of the processing module. Furthermore, all or some of these modules may be integrated together or may be implemented independently. The processing element described here may be an integrated circuit having signal processing capabilities. In an implementation, operations of the method described above or the above modules may be accomplished by an integrated logic circuit in hardware in the processing element or by instructions in the form of software.

For example, the above modules may be one or more integrated circuits configured to implement the above method, such as one or more Application Specific Integrated Circuits (ASIC), or one or more microprocessors (Digital Signal Processor, DSP), or one or more Field Programmable Gate Arrays (FPGA), etc. For example, when one of the above modules is implemented in a form of the processing element scheduling program codes, the processing element may be a general-purpose processor, such as a Central Processing Unit (CPU) or other processors capable of invoking program codes. For example, these modules may be integrated together and implemented as a System-On-a-Chip (SOC).

The above embodiments may be implemented in whole or in part by software, hardware, firmware, or any combination thereof. When implemented by software, the embodiments may be implemented in whole or in part in the form of a computer program product. The computer program product includes one or more computer instructions. When the computer program instructions are loaded and executed on a computer, all or part of the processes or functions according to the embodiments of the present disclosure are generated. The computer may be a general-purpose computer, a dedicated computer, a computer network, or another programmable apparatus. The computer instructions may be stored in a computer-readable storage medium, or transmitted from one computer-readable storage medium to another. For example, the computer instructions may be transmitted from one web site, computer, server, or data center to another via a wired (e.g., coaxial cable, optical fiber, Digital Subscriber Line (DSL)) or wireless (e.g., infrared, wireless, microwave, etc.) connection. The computer-readable storage medium can be any available medium that can be accessed by a computer, or can be a data storage device such as a server or a data center integrated with one or more available media. The available media may be magnetic media (e.g., floppy disks, hard disks, magnetic tapes), optical media (e.g., Digital Video Discs (DVD)), or semiconductor media (e.g., Solid State Disks (SSDs)), etc.

Figure 9:
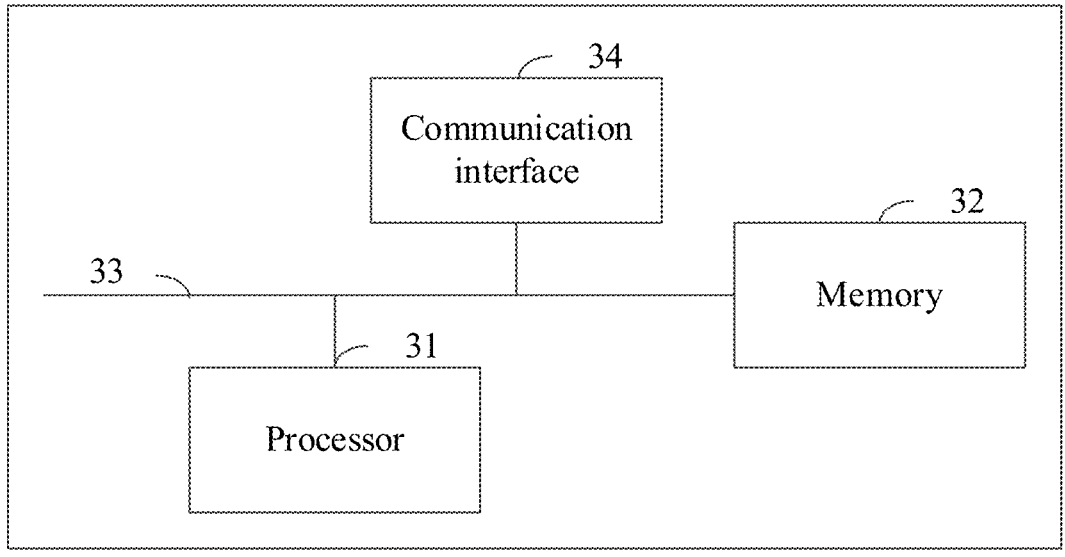
FIG. 9 is a schematic diagram showing a structure of a terminal device according to an embodiment of the present disclosure.

FIG. 9 is a schematic diagram showing a structure of a terminal device according to an embodiment of the present disclosure. As illustrated in FIG. 9, the terminal device in the embodiment may include a processor 31 and a memory 32. The memory 32 has executable instructions of the processor 31 thereon. The processor 31 is configured to perform, when executing the executable instructions, the information processing method in the above-mentioned method embodiments.

In an embodiment, the memory 32 may be independent or integrated with the processor 31.

When the memory 32 is a device independent of the processor 31, the terminal device in the embodiment may further include a bus 33 configured to connect the memory 32 to the processor 31.

In an embodiment, the terminal device of the embodiment may further include a communication interface 34. The communication interface 34 may be connected to the processor 31 via the bus 33.

Figure 10:
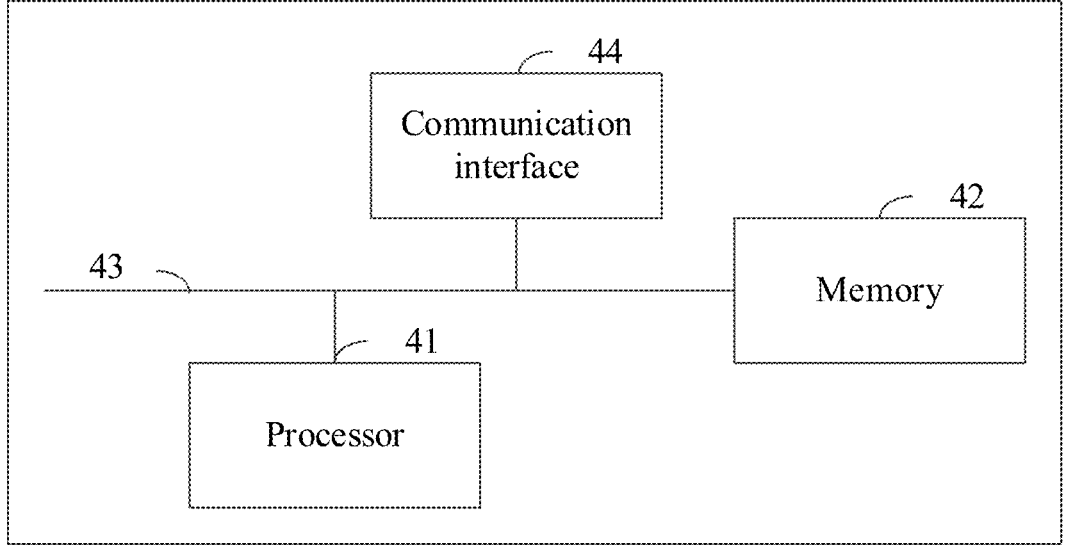
FIG. 10 is a schematic diagram showing a structure of a server according to an embodiment of the present disclosure.
Figure 11:
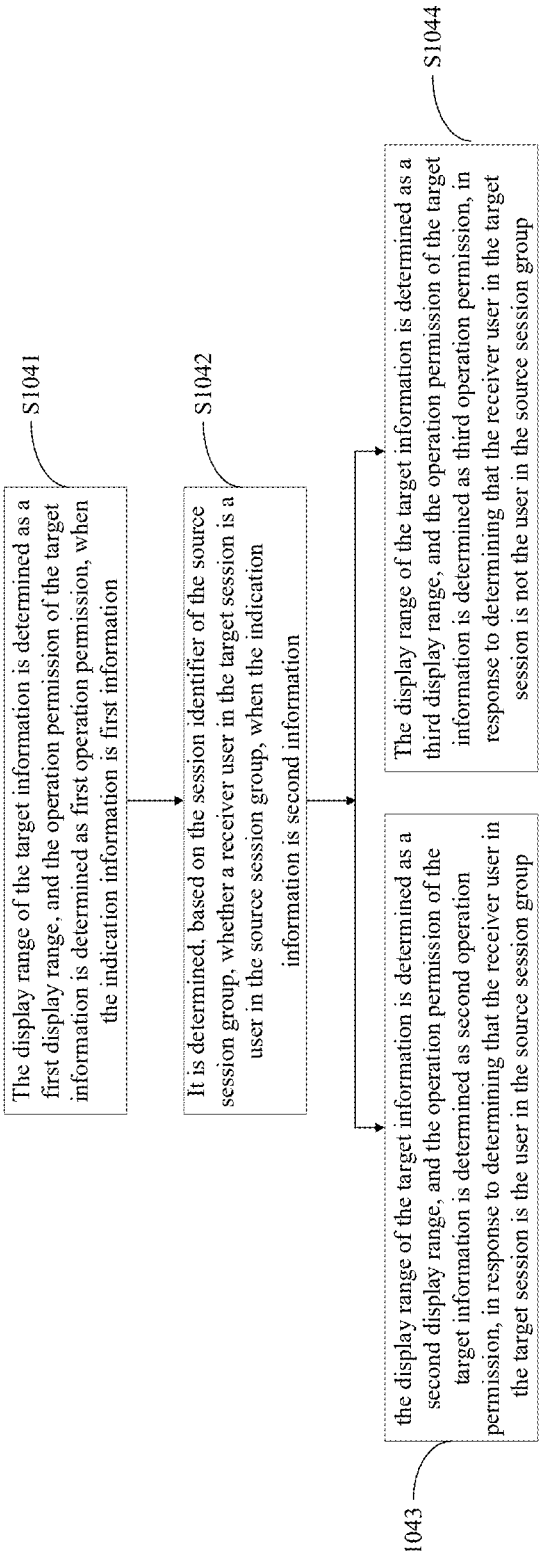
FIG. 11 is a flowchart of a specific implementation of determining a display range of the target information and operation permission of the target information according to an embodiment of the present disclosure.

FIG. 10 is a schematic diagram showing a structure of a server according to an embodiment of the present disclosure. As illustrated in FIG. 10, the server of the embodiment may include a processor 41 and a memory 42. The memory 43 has executable instructions of the processor 41 thereon. The processor 41 is configured to perform, when executing the executable instructions, the information processing method in the above-mentioned method embodiments.

In an embodiment, the memory 42 may be independent or integrated with the processor 41.

When the memory 42 is a device independent of the processor 41, the server of the embodiment may further include a bus 43 configured to connect the memory 42 to the processor 41.

In an embodiment, the server of the embodiment may further include a communication interface 44. The communication interface 44 may be connected to the processor 41 via the bus 43.

The present disclosure further provides a computer-readable storage medium. The computer-readable storage medium has a computer program stored thereon. The computer program, when executed by a processor, implements the information processing method in the above-mentioned embodiments.

Embodiments of the embodiments of the present disclosure further provide a computer program product. The computer program product includes a computer program. The computer program, when executed by a processor, implements the information processing method in the above-mentioned embodiments.

In the description of this specification, descriptions with reference to the terms "an embodiment", "some embodiments", "an exemplary embodiment", "an example", "a specific example", or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner. In addition, different embodiments or examples and features of different embodiments or examples described in the specification may be combined by those skilled in the art without mutual contradiction.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. A forwarded information processing method, applied to a client where a target session is located, the information processing method comprising:

receiving target information, a session identifier of a source session group, and indication information that are transmitted by a server, the target information being generated based on to-be-forwarded information from the source session group, and the indication information indicating a type of the source session group;

determining a display range of the target information and operation permission of the target information based on the indication information and the session identifier of the source session group; and rendering and displaying the target information in the target session based on the display range of the target information and the operation permission of the target information, wherein:

said determining the display range of the target information and the operation permission of the target information based on the indication information and the session identifier of the source session group comprises:

after determining that the indication information is second information indicating that the source session group is a private group, determining, based on the session identifier of the source session group, whether a receiver user in the target session is a user in the source session group;

determining the display range of the target information as a second display range, and determining the operation permission of the target information as second operation permission, after determining that the receiver user in the target session is the user in the source session group; and determining the display range of the target information as a third display range, and determining the operation permission of the target information as third operation permission, after determining that the receiver user in the target session is not the user in the source session group, wherein the second display range is greater than the third display range.

2. The method according to claim 1, wherein said determining the display range of the target information and the operation permission of the target information based on the indication information and the session identifier of the source session group further comprises:

after determining that the indication information is first information, determining the display range of the target information as a first display range, and determining the operation permission of the target information as first operation permission.

3. The method according to claim 2, wherein the first information indicates that the source session group is a public group.

4. The method according to claim 1, wherein:

the source session group is a topic group; and the to-be-forwarded information includes original information and operation information on the original information by the user in the source session group.

5. The method according to claim 1, wherein the target information is information of a nested structure.

6. The method according to claim 5, wherein:

the target information comprises first-level information and second-level information;

the display range of the target information comprises a display range of the first-level information and a display range of the second-level information; and the operation permission of the target information comprises operation permission of the first-level information and operation permission of the second-level information.

7. The method according to claim 6, wherein said rendering and displaying the target information in the target session based on the display range of the target information and the operation permission of the target information comprises:

rendering the first-level information to generate a first view, displaying the first view based on the display range of the first-level information, and setting operation permission of the first view based on the operation permission of the first-level information; and rendering, after detecting a clicking operation on the first view by the user corresponding to the client, the second-level information to generate a second view, displaying the second view on a current interface based on the display range of the second-level information, and setting operation permission of the second view based on the operation permission of the second-level information.

8. The method according to claim 6, wherein:

the first-level information comprises a name of the source session group and a title determined based on the to-be-forwarded information;

the second-level information comprises the to-be-forwarded information; and the to-be-forwarded information comprises original information and operation information on the original information by the user in the source session group.

9. The method according to claim 8, wherein:

in a first display range, the display range of the first-level information comprises displaying the name of the source session group in a first view, and the operation permission of the first-level information comprises clicking the first view to jump to a second view;

in a second display range, the display range of the first-level information comprises displaying the name of the source session group in the first view, and the operation permission of the first-level information comprises clicking the first view to jump to the second view; and in a third display range, the display range of the first-level information comprises hiding the name of the source session group in the first view, and the operation permission of the first-level information comprises clicking the first view to jump to the second view.

10. The method according to claim 8, wherein:

in a first display range, the display range of the second-level information comprises displaying, in a second view, the original information contained in the to-be-forwarded information and real-time operation information on the original information by the user in the source session group, and the operation permission of the second-level information comprises performing a predetermined operation on the to-be-forwarded information in the second view;

in a second display range, the display range of the second-level information comprises displaying, in the second view, the original information contained in the to-be-forwarded information and the real-time operation information on the original information by the user in the source session group, and the operation permission of the second-level information comprises performing the predetermined operation on the to-be-forwarded information in the second view; and in a third display range, the display range of the second-level information comprises displaying, in the second view, the original information contained in the to-be-forwarded information and operation information on the original information by the user in the source session group prior to the to-be-forwarded information being forwarded, and the operation permission of the second-level information comprises performing no predetermined operation on the to-be-forwarded information in the second view.

11. The method according to claim 10, wherein the predetermined operation comprises at least one of a reply, a like, a comment, forwarding, or a subscription.

12. The method according to claim 10, wherein in the first display range, the second display range, and the third display range, the display range of the second-level information further comprises displaying, in the second view, overview information of the to-be-forwarded information and a source of the to-be-forwarded information.

13. A non-transitory computer-readable storage medium, having a computer program stored thereon, wherein the computer program, when executed by a processor, implements the information processing method according to claim 1.

14. A forwarded information processing method, applied to a server, the information processing method comprising:

receiving an information forwarding request transmitted by a client, the information forwarding request carrying to-be-forwarded information from a source session group, an identifier of a target session, and a type of the source session group;

generating target information based on the to-be-forwarded information; and transmitting the target information, a session identifier of the source session group, and indication information to a target client corresponding to a user in the target session, the indication information indicating the type of the source session group to allow the target client to determine a display range of the target information and operation permission of the target information based on the indication information and the session identifier of the source session group, and render and display the target information in the target session based on the display range of the target information and the operation permission of the target information, wherein:

the target client is further allowed to:

after determining that the indication information is second information indicating that the source session group is a private group, determine, based on the session identifier of the source session group, whether a receiver user in the target session is a user in the source session group;

determine the display range of the target information as a second display range, and determine the operation permission of the target information as second operation permission, after determining that the receiver user in the target session is the user in the source session group; and determine the display range of the target information as a third display range, and determine the operation permission of the target information as third operation permission, after determining that the receiver user in the target session is not the user in the source session group, wherein the second display range is greater than the third display range.

15. The method according to claim 14, wherein:

the target information comprises first-level information and second-level information;

the display range of the target information comprises a display range of the first-level information and a display range of the second-level information; and the operation permission of the target information comprises operation permission of the first-level information and operation permission of the second-level information.

16. The method according to claim 15, wherein:

the first-level information comprises a name of the source session group and a title determined based on the to-be-forwarded information;

the second-level information comprises the to-be-forwarded information; and the to-be-forwarded information comprises original information and operation information on the original information by the user in the source session group.

17. A server, comprising:

a processor; and a memory having executable instructions of the processor stored thereon, wherein the processor is configured to perform, when executing the executable instructions, the information processing method according to claim 14.

18. A non-transitory computer-readable storage medium, having a computer program stored thereon, wherein the computer program, when executed by a processor, implements the information processing method according to claim 14.

19. A terminal device, comprising:

a processor; and a memory having executable instructions of the processor stored thereon, wherein a target session is located on the terminal device, and wherein the processor is configured to cause, when executing the executable instructions, the terminal device to:

receive target information, a session identifier of a source session group, and indication information that are transmitted by a server, the target information being generated based on to-be-forwarded information from the source session group, and the indication information indicating a type of the source session group;

determine a display range of the target information and operation permission of the target information based on the indication information and the session identifier of the source session group; and render and display the target information in the target session based on the display range of the target information and the operation permission of the target information, wherein:

the processor is further configured to cause, when executing the executable instructions, the terminal device to:

after determining that the indication information is second information indicating that the source session group is a private group, determine, based on the session identifier of the source session group, whether a receiver user in the target session is a user in the source session group;

determine the display range of the target information as a second display range, and determine the operation permission of the target information as second operation permission, after determining that the receiver user in the target session is the user in the source session group; and determine the display range of the target information as a third display range, and determine the operation permission of the target information as third operation permission, after determining that the receiver user in the target session is not the user in the source session group, wherein the second display range is greater than the third display range.

20. The terminal device according to claim 19, wherein said determining the display range of the target information and the operation permission of the target information based on the indication information and the session identifier of the source session group further comprises:

after determining that the indication information is first information, determine the display range of the target information as a first display range, and determining the operation permission of the target information as first operation permission.

\*  \*  \*  \*  \*